US010673831B2

(12) United States Patent
Sahraei et al.

(10) Patent No.: US 10,673,831 B2
(45) Date of Patent: Jun. 2, 2020

(54) SYSTEMS AND METHODS FOR AUTOMATING SECURITY CONTROLS BETWEEN COMPUTER NETWORKS

(71) Applicant: MasterCard International Incorporated, Purchase, NY (US)

(72) Inventors: Sasan Sahraei, Dublin (IE); Navjot S. Sidhu, Ardsley, NY (US); Eric G. Alger, Edwardsville, IL (US); Jenny Qian Zhang, Wildwood, MO (US)

(73) Assignee: Mastercard International Incorporated, Purchase, NY (US)

( * ) Notice: Subject to any disclaimer, the term of this patent is extended or adjusted under 35 U.S.C. 154(b) by 145 days.

(21) Appl. No.: 15/675,524

(22) Filed: Aug. 11, 2017

(65) Prior Publication Data
US 2019/0052621 A1    Feb. 14, 2019

(51) Int. Cl.
*H04L 29/06*    (2006.01)
(52) U.S. Cl.
CPC ...... *H04L 63/0807* (2013.01); *H04L 63/0823* (2013.01); *H04L 63/10* (2013.01)
(58) Field of Classification Search
CPC .. H04L 63/0807; H04L 63/0823; H04L 63/10
See application file for complete search history.

(56) References Cited

U.S. PATENT DOCUMENTS

| 7,958,102 | B1 * | 6/2011 | Satish ................ G06F 21/6245 707/706 |
| 8,984,582 | B2 | 3/2015 | Ruppin et al. |
| 9,087,189 | B1 | 7/2015 | Koeten et al. |
| 9,313,203 | B2 | 4/2016 | Adler et al. |
| 9,413,724 | B2 | 8/2016 | Xu |
| 2011/0247055 | A1 * | 10/2011 | Guo ................... H04L 63/0823 726/4 |
| 2012/0005740 | A1 | 1/2012 | Wurth |
| 2013/0007856 | A1 * | 1/2013 | Bennett .................. G06F 21/33 726/6 |

(Continued)

FOREIGN PATENT DOCUMENTS

WO    2015012933 A2    1/2015

OTHER PUBLICATIONS

PCT International Search Report and Written Opinion, Application No. PCT/US2018/041954, dated Sep. 14, 2018, 12 pps.

*Primary Examiner* — Meng Li
(74) *Attorney, Agent, or Firm* — Armstrong Teasdale LLP

(57) ABSTRACT

A security control (SC) system including one or more security control (SC) computing devices for automating security controls between computer networks is provided. The SC system is configured to receive a request to access a service including a system identifier that identifies a computer system requesting access to a service controlled by the one or more SC computing devices, build a token request based on the request, and correlate the token request to at least one security policy associated with the system identifier. The SC system is also configured to generate an access token in response to the token request, wherein the access token is included in an authorization request, and invoke the service using the authorization request. The SC system is further configured to validate the access token using the at least one security policy and authorize access to the service based on the at least one security policy.

18 Claims, 7 Drawing Sheets

(56) References Cited

U.S. PATENT DOCUMENTS

| | | |
|---|---|---|
| 2015/0081885 A1 | 3/2015 | Thomas et al. |
| 2015/0350212 A1 | 12/2015 | Amiri |
| 2016/0065618 A1 | 3/2016 | Banerjee |
| 2016/0330219 A1 | 11/2016 | Hasan |
| 2017/0104755 A1 | 4/2017 | Arregoces et al. |
| 2017/0126685 A1* | 5/2017 | Taylor .................... G06F 21/10 |
| 2018/0034809 A1* | 2/2018 | Lavedrine ........... H04L 63/0807 |

* cited by examiner

SYSTEMS AND METHODS FOR AUTOMATING SECURITY CONTROLS BETWEEN COMPUTER NETWORKS

BACKGROUND

The field of the present disclosure relates generally to networks and, more particularly, to systems and methods for automating security controls between computer networks.

At least some known service provider systems enable security controls in inter-service communications between computer networks. Such security controls may include access control, audit for services provided, and enforcement of security controls. Enabling these security controls is a complex task that often involves the performance of a set of manual tasks, such as creating and provisioning policies, generating credentials and encrypting materials, developing enforcements of policies for each individual service, and granting permissions for services and network resources to access the system.

Furthermore, as systems evolve from primarily statically configured hub-and-spoke architecture models supported by Enterprise Service Bus implementations to dynamic service interactions in cloud environments, the ability to enable controls, grant permissions, and enforce controls at run time becomes a significant burden for development and operation teams. The burden is based on the dynamic nature of cloud environments where configurations and topologies can no longer be statically defined and managed.

Performing manual tasks in cloud environments increases not only costs and risk of errors, but also and, more importantly, the potential for security vulnerabilities and the complexity in troubleshooting any problems due to the lack of consistency in implementations involved in such environments.

BRIEF DESCRIPTION

In one aspect, a security control (SC) system including one or more security control (SC) computing devices for automating security controls between computer networks is provided. The one or more SC computing devices include a processor communicatively coupled to a memory. The SC system is configured to receive a request to access a service that identifies a computer system requesting access to a service controlled by the one or more SC computing devices, build a token request based on the received request, and correlate the token request to at least one security policy associated with the system identifier. The SC system is also configured to generate an access token in response to the token request, wherein the access token is included in an authorization request and invoke the service using the authorization request. The SC system is further configured to validate the access token using the at least one security policy and authorize access to the service based on the at least one security policy.

In another aspect, a computer-implemented method for automating security controls between computer networks is provided. The method is performed using one or more security control (SC) computing devices that include at least one processor in communication with at least one memory device. The method includes receiving a request to access a service including a system identifier service that identifies a computer system requesting access to a service controlled by the one or more SC computing devices, building a token request based on the received request, and correlating the token request to at least one security policy associated with the system identifier. The method also includes generating an access token in response to the token request, wherein the access token is included in an authorization request and invoking the service using the authorization request. The method further includes validating the access token using the at least one security policy and authorizing access to the service based on the at least one security policy.

In yet another aspect, a non-transitory computer readable medium that includes executable instructions for automating security controls between computer networks is provided. When the computer executable instructions are executed by one or more security control (SC) computing devices that include at least one processor in communication with at least one memory device, the computer executable instructions cause the one or more SC computing devices to receive a request to access a service including a system identifier service that identifies a computer system requesting access to a service controlled by the one or more SC computing devices, build a token request based on the received request, and correlate the token request to at least one security policy associated with the system identifier. The computer executable instructions also cause the one or more SC computing devices to generate an access token in response to the token request, wherein the access token is included in an authorization request and invoke the service using the authorization request. The computer executable instructions further cause the one or more SC computing devices to validate the access token using the at least one security policy and authorize access to the service based on the at least one security policy.

BRIEF DESCRIPTION OF THE DRAWINGS

FIG. 1 is a schematic diagram illustrating an example multi-party payment platform system for automating security controls between computer networks.

FIG. 2 is a simplified block diagram of an example processing system for automating security controls between computer networks.

FIG. 3 illustrates an example configuration of a user system operated by a consumer, such as the consumer shown in FIG. 1.

FIG. 4 illustrates an example configuration of a server system such as the server system shown in FIGS. 2 and 3.

FIG. 5 is an example configuration of a security control (SC) computing device.

FIG. 6 is an example flow diagram illustrating a method flow for automating security controls between computer networks.

FIG. 7 shows an example configuration of a database within a computing device, along with other related computing components, that may be used to automate security controls between computer networks.

DETAILED DESCRIPTION

Figure 1:
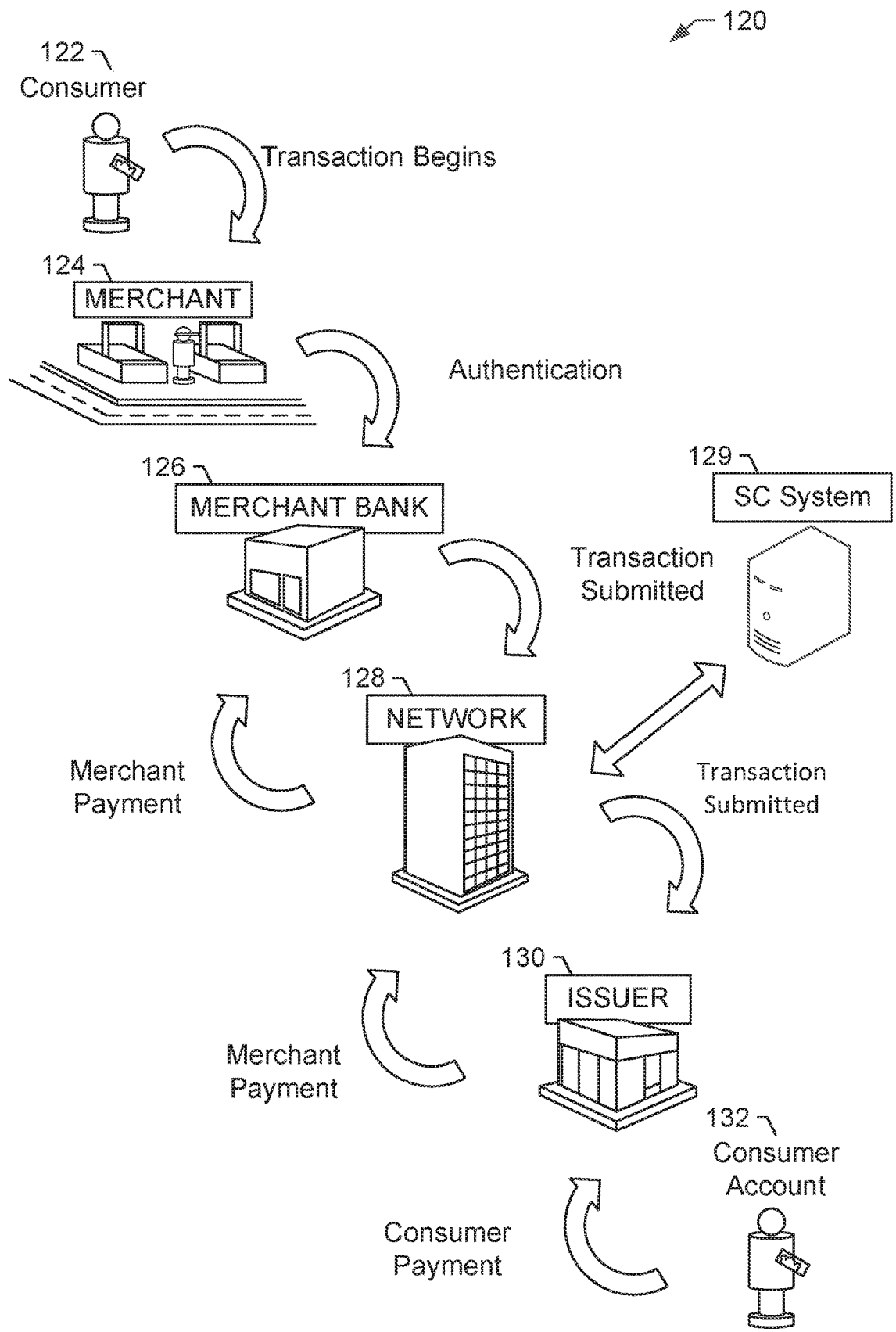
FIGS. 1-7 show example embodiments of the methods and systems described herein.

The systems and methods described herein are configured to include processing systems for automating security controls between computer networks. In the exemplary embodiment, the processing system enables a holistic end-to-end solution for automating the development, provisioning, refreshing, and enforcing access control policies for enabling authentication and authorization controls between computer networks and, more specifically, between Application Program Interfaces (APIs). The processing system performs automated generation of access control policies based on application dependency graphs (also referred to as "declared dependency graphs") and meta-data associated with application dependencies. The automated generation of access control policies creates credentials based on the policies, provisions the credentials in services and applications, transmits the credentials in an inter-process communication, validates the credentials, and limits access based on the declared dependencies of the applications or services at design time.

In the exemplary embodiment, the processing system includes a security control (SC) system configured to automate security controls between computer networks based on access control policies. The SC system may include one or more security control (SC) devices. In the exemplary embodiment, a SC computing device is configured to generate and execute policy definitions, and facilitate provisioning of credentials using a micro-service architecture of an API. The SC computing device is also configured to automate security policies for authentication and authorization based on a model that is generated, as part of the API architecture or any architecture enabling access control between systems, by a declarative runtime dependency definition. The declarative runtime dependency definition is applied to the functionality of the security policies outside the API and modifies the configuration of the security policies while the API is running. The model is represented as a dependency graph and includes meta-data for each of the dependencies, such as network zones, relevant components that the network zones may be part of, and security groups and roles required for enabling access to such components.

The SC computing device is further configured to provision the security policies to the API configuration. In addition to packaging the declarative runtime dependency definition with the API as code, the SC computing device is also configured to publish the generated policy to a policy management engine (also referred to as "security controller") that may be within or external to the SC computing device. The security controller analyzes the generated policy and internally updates the policies for existing services to create security groups, add system users to groups, and create authorizations and permissions for new inter-service security management for those groups. The SC computing device requests, using a service runtime framework, the security controller for the security policy that must be enforced at the time a service is started in any environment. At this time, the SC computing device also provisions the identity tokens that would authenticate and authorize the service runtime to other services in the environment, primarily the service runtime declared dependencies. At runtime, the service runtime not only authenticates and authorizes requests to the service based on the policies, but also uses the issued tokens to enable other services in the environment to authenticate and authorize requests coming from the service itself.

The SC computing device is also configured to use the declared dependency graph to generate a network topology based on service metadata identifying network and availability zones where each service operates in and, by extension, identifying the firewalls and network devices in a network path. The security controller may be configured to use the network topology for self-authentication. The security controller may also be configured to provision network devices for enabling the requisite paths by leveraging an application group association to predefined policies, and hence, functioning at a layer that does not require privileged access.

The security controller may also be configured to expose the security approved dependencies and network topology to the monitoring systems. By exposing the security dependencies and network topology, the SC computing device may track and compare expected traffic pattern to observed traffic patterns. The comparison enables the SC computing device to detect issues with the system configuration in real time, in most cases instantaneously at service startup, and to detect patterns that may not be compliant with the security policies, and hence, enabling the SC computing device to immediately identify a potential threat.

In the exemplary embodiment, the SC computing device includes a security controller, Policy Administration Point (PAP), a Policy Decision Point (PDP), a Policy Retrieval Point (PRP), a Policy Enforcement Point (PEP), and an output adaptor component. The PAP is configured to create, update, delete, and retrieve policies, more specifically, policy schema. Policies in the PAP are accessible through a Software Development Kit (SDK), and the APIs may download the policies from the PAP using the SDK. The PAP is in communication with the PRP which is a database that the PAP uses to store policies. The PAP may provide interfaces to create and/or update any policy. The PAP may also provide interfaces to obtain a set of policies associated with one or more APIs. When requests include name and namespace, the PAP only retrieves active policies. Retrieval (read-only) method queries for policies using API's Fully Qualified Domain Name (FQDN) attributes, such as HTTP GET/authorization/pap/policies/<service namespace>/<service name>. The PAP further provides a front-end User Interface (UI) to facilitate operation on policies. In certain embodiments, the front-end is integrated with Cortex. The PAP also provides interfaces for PDP to store and update a public key and read only interface for APIs for downloading the public key. Security between the PAP and the PAP's client is based on Multiplexed Transport Layer Security (MTLS) protocol.

The PAP is also configured to grant to users read-only access to any API policy. However, some users, such as Service Providers, Domain Representatives, and Corporate Security, may have Read/Write (RW) access to the API policies for all environments except for Production. The PAP is further configured to grant to users read-only access to public keys. However, the PDP may have RW access to public keys. Once an API policy is designed, the policy needs to be signed by the PAP. In some embodiments, the signature may be stored in as an attribute within the policy. In other embodiments, the signature may be stored outside the policy.

The PDP is configured to download and/or retrieve the API security policies available from the PAP and, more specifically, from the PRP. The PDP is also configured to store, in a cache cluster memory, the policies as secure shared cache. Once the security controller updates the API security policy through the PAP, the security controller pushes the update to the PDP to update the cache stored in the cache cluster memory. When a user (e.g., issuer, consumer, acquirer, merchant, or the like) submits to the SC computing device a request for accessing information, the SC computing device uses a prism to initiate the authentication and authorization process for the request. The prism, as used herein, refers to a SDK that performs multiple tasks, which include managing tokens and loading balance between multiple APIs.

The prism includes a Token Manager that assembles and transmits a token request to the PDP upon receiving a request to build the token request from the prism. The token request includes details associated with the user and the information (e.g., endpoint) that the user is trying to access. Such details may include a target endpoint, an action on the endpoint, a Fully Qualified Name (FQN), a system identifier, a computing device identifier, or the like. The PDP is configured to read the client Distinguished Name (DN) of the certificate from the MTLS protocol provided over the user session. The PDP is further configured to query the cache for the security policy for the target service of the request, retrieve the Group Distinguished Name (GDN) of the target endpoint and the action on the endpoint, and query the retrieved security policy for membership of the client DN to access the endpoint.

Once the PDP finishes processing the token request, the PDP generates and transmits an authorization or decline response to the Token Manager. The authorization response may include "permitted", and the decline response may include "declined", or "not applicable". If the token request is authorized, the PDP generates an access token, such as, for example, a JWS or a JSON Web Encryption (JWE) token which the PDP signs. If the security policies request for the access token to be encrypted, the PDP signs the access token first and then encrypt it. The signature and encryption algorithms are defined by the API policy. The PDP is configured to transmit the access token to the Token Manager. When the access token is received by the Token Manager, the Token Manager caches the access token and the prism adds the access token to an authorization request, invokes the API, and transmits the authorization request to the API.

In the exemplary embodiment, the PEP is an interceptor plugged into API. The PEP is configured to analyze any API's request before any other interceptors, making the PEP the highest priority interceptor. On the API startup, the PEP may download all the information from the PAP that the PEP requires for validating an authorization request. The information may include the API policies and public keys in JSON Web Key (JWK) format. The PEP is configured to intercept API's inbound requests. The PEP is also configured to validate the access token in the authorization request, and either grant or reject access to the authorization request to the API. The API business logic has access to any identity that has been included within the access token. Therefore, the API may propagate the identity, if the identity is consuming another service, and/or may use the identity to control granularity of access to the API's functionality and data.

When a user calls any APIs, the SC computing device uses the prism to invoke the target service. The prism may contain a cache of access tokens which may be updated prior to the access token expiration. A background process in the prism monitors the cached access tokens for their expiration time-stamp. If an access token is near to expire, the access token is refreshed/renewed and the cache is updated. This process improves performance and avoids the cycle of token request and generation on every single token request.

In the exemplary embodiment, the SC computing device is configured to store information for each transaction, such as logs, events, and metrics. For example, the SC computing device may store any point to point messages irrespective of the severity, which may include user to PDP, PDP to user, and user to API. The SC computing device may also store any log, event, or metric related to a denial of access ("severity": "ERROR"), which may include PDP declining access or PEP not authorizing an API's request. The SC computing device may further store other internal processing related messages if the messages have severity above ERROR (e.g., CRITICAL, HIGH and ERROR). In addition, the PDP may log the user that is trying to access the SC computing device and whether the access was authorized or declined. The PDP may also log the type of token (e.g., encoded or decoded) that is trying to access the SC system and whether the access was authorized or declined.

A technical effect of the systems and processes described herein include at least one of: (a) receiving a request to access a service including a system identifier, (b) building a token request based on the received request, (c) correlating the token request to at least one security policy associated with the system identifier, (d) generating an access token in response to the token request, wherein the access token is included in an authorization request, (e) invoking the service using the authorization request, (f) validating the access token using the at least one security policy, and (g) authorizing access to the service based on the at least one security policy.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In some embodiments, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account data, such as mobile phones, Smartphones, personal digital assistants (PDAs), key fobs, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited FIG. 1 is a schematic diagram illustrating an example multi-party transaction card industry system 120 for enabling payment-by-card transactions in which merchants 124 and card issuers 130 do not need to have a one-to-one relationship. Embodiments described herein may relate to a transaction card system, such as a credit and/or debit card payment system using the Mastercard® interchange network. The Mastercard® interchange network is a set of proprietary communications standards promulgated by Mastercard International Incorporated® for the exchange of financial transaction data and the settlement of funds between financial institutions that are registered with Mastercard International Incorporated®. (Mastercard is a registered trademark of Mastercard International Incorporated located in Purchase, N.Y.).

FIG. 1 is a schematic diagram illustrating an example multi-party transaction card industry system 120 for enabling payment-by-card transactions in which merchants 124 and card issuers 130 do not need to have a one-to-one relationship. Embodiments described herein may relate to a transaction card system, such as a credit and/or debit card payment system using the Mastercard® interchange network. The Mastercard® interchange network is a set of proprietary communications standards promulgated by Mastercard International Incorporated® for the exchange of financial transaction data and the settlement of funds between financial institutions that are registered with Mastercard International Incorporated®. (Mastercard is a registered trademark of Mastercard International Incorporated located in Purchase, N.Y.).

In a typical transaction card system, a financial institution called the "issuer" issues a transaction card or electronic payment account identifier, such as a credit card, to a consumer 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When consumer 122 tenders payment for a purchase with a transaction card, merchant 124 requests authorization from a merchant bank 126 for the amount of the purchase. The request may be performed over the telephone, but is usually performed through the use of a point-of-sale terminal, which reads user's 122 account information from a magnetic stripe, a chip, a two-dimensional code, or embossed characters on the transaction card and communicates electronically with the transaction processing computers of merchant bank 126. Alternatively, merchant bank 126 may authorize a third party to perform transaction processing on its behalf. In this case, the point-of-sale terminal (POS) will be configured to communicate with the third party. Such a third party is usually called a "merchant processor," an "acquiring processor," or a "third party processor."

Using an interchange network 128, computers of merchant bank 126 or merchant processor will communicate with computers of an issuer bank 130 to determine whether user's 122 account 132 is in good standing and whether the purchase is covered by user's 122 available credit line. Based on these determinations, the request for authorization will be declined or accepted. If the request is accepted, an authorization code is issued to merchant 124.

In the exemplary embodiment, consumer 122 provides consumer account data. During authorization, one or more parties to the transaction, such as network 128, may communicate with a security control (SC) system 129 that is configured to perform an authorization process associated with the transaction. In the exemplary embodiment, SC system 129 performs authorization of transaction data (which includes account data) for payment transactions. SC system 129 includes a security control (SC) computing device which is capable of automate security controls using one or more security policies. During operation, network 128 transmits transaction data to SC system 129 as a part of the overall authorization process for payment transactions.

When a request for authorization is accepted (e.g., authorization request message), the available credit line of consumer's 122 account 132 is decreased. Normally, a charge for a payment card transaction is not posted immediately to user's 122 account 132 because bankcard associations, such as Mastercard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If consumer 122 cancels a transaction before it is captured, a "void" is generated. If consumer 122 returns goods after the transaction has been captured, a "credit" is generated. Interchange network 128, SC system 129 and/or issuer bank 130 stores the transaction card information, such as a category of merchant, a merchant identifier, a location where the transaction was completed, amount of purchase, date and time of transaction, in a database, such as database 220 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, consumer account information, a type of transaction, information regarding the purchased item and/or service, and/or other suitable information, is associated with a transaction and transmitted between parties to the transaction as transaction data, and may be stored by any of the parties to the transaction. In the exemplary embodiment, when consumer 122 makes a purchase an authorization request is transmitted during the clearance process along with transaction data. When interchange network 128 receives the authorization request, interchange network 128 routes the authorization request to SC system 129.

For debit card transactions, when a request for a personal identification number (PIN) authorization is approved by the issuer, consumer's 122 account 132 is decreased. Normally, a charge is posted immediately to consumer's 122 account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant's 124 account, merchant bank 126, and issuer bank 130 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

Figure 2:
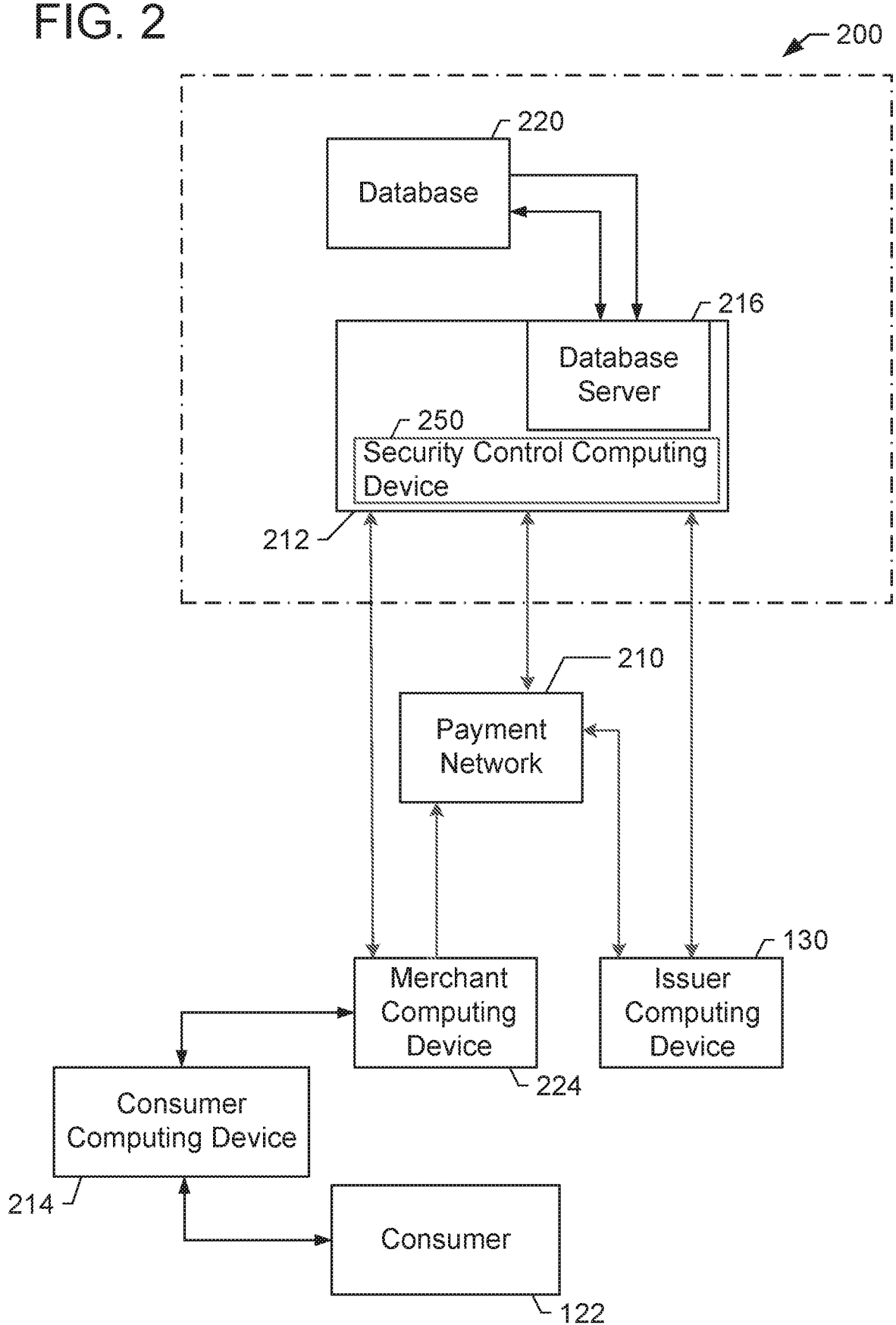

FIG. 2 is a simplified block diagram of an example security control (SC) system 200, similar to SC system 129 (shown in FIG. 1), in which a variety of computing devices are communicatively coupled to each other via a plurality of network connections. These network connections may be Internet, LAN/WAN, or other connections capable of transmitting data across computing devices. SC system 200 includes security control (SC) computing device 250 and database server 216. In one embodiment, SC computing device 250 and database 216 are components of server system 212. Server system 212 may be a server, a network of multiple computer devices, a virtual computing device, or the like. SC computing device 250 is connected to at least one merchant computing device 224, and an issuer computing device 130 via at least a payment network 210.

Database server 216 is connected to database 220, which contains information on a variety of matters, as described below in greater detail. In one embodiment, database 220 is stored on server system 212 and can be accessed by potential users of server system 212. In an alternative embodiment, database 220 is stored remotely from server system 212 and may be non-centralized. Database 220 may include a single database having separated sections or partitions or may include multiple databases, each being separate from each other. Database 220 is in communication with SC computing device 250 and may store transaction data, such as logs, events, and metrics, associated with consumer's 122 account 132.

In another embodiment, SC computing device 250 is configured to receive transaction data from merchant computing device 224, over payment network 210. As noted with respect to FIG. 1, when consumer 122 performs a transaction at a merchant location, transaction data is generated. Transaction data may be transmitted across computing devices as an authorization request message. In one embodiment, when a consumer performs a transaction at merchant computing device 224 associated with merchant 124, transaction data for the transaction is transmitted to server system 212. Server system 212 processes the transaction data in the manner described with respect to FIG. 1 and also transmits it to SC computing device 250.

The transaction data may include transaction amount, a transaction date, account data related to the payment card used to perform the transaction (e.g., PAN associated with payment card, card expiration date, card issuer, card security code, or the like), a merchant identifier, stock-keeping unit (SKU) data relating to the goods or services purchased from the consumer, or the like.

In the exemplary embodiments, SC computing device 250 receives an authorization request message along with transaction data (e.g., merchant information, SKU data relating to the goods or services purchased from the consumer, or the like). SC computing device 250 is also configured to store transaction data in database 220 based on the account identifier associated with consumer 122. SC computing device 250 is further configured to receive one or more authorization request messages that may include an identifier of consumer computing device 214, an account identifier of consumer 122, and other data associated with consumer 122.

SC computing device 250 is also configured to automate security controls between computer networks based on access control policies. In the exemplary embodiment, SC computing device 250 is configured to generate and execute policy definitions, and facilitate provisioning of credentials using the micro-service architecture of an API. SC computing device 250 is also configured to automate security policies for authentication and authorization based on a model that is generated, as part of the API architecture or any architecture enabling access control between systems, by a declarative runtime dependency definition. The declarative runtime dependency definition is applied to the functionality of the security policies outside the API and modifies the configuration of the security policies while the API is running.

SC computing device 250 is further configured to publish the generated policy to a policy management engine (also referred to as security controller) that may be within or outside SC computing device 250. SC computing device 250 is also configured to use a declared dependency graph to generate a network topology based on service metadata identifying network and availability zones where each service operates in and, by extension, identifying the firewalls and network devices in a network path.

In the exemplary embodiment, SC computing device 250 is located within or in communication with server system 112 and may include a security controller, Policy Administration Point (PAP), a Policy Decision Point (PDP), a Policy Retrieval Point (PRP), a Policy Enforcement Point (PEP), and an output adaptor component (all described below). SC computing device 250 is communicatively coupled to an input adaptor located payment network 210. SC computing device 250 and input adaptor of payment network 210 are interconnected via a network (e.g., the Internet) through many interfaces including a network 115, such as a local area network (LAN) or a wide area network (WAN), dial-in-connections, cable modems, special high-speed Integrated Services Digital Network (ISDN) lines, and RDT networks.

Figure 3:
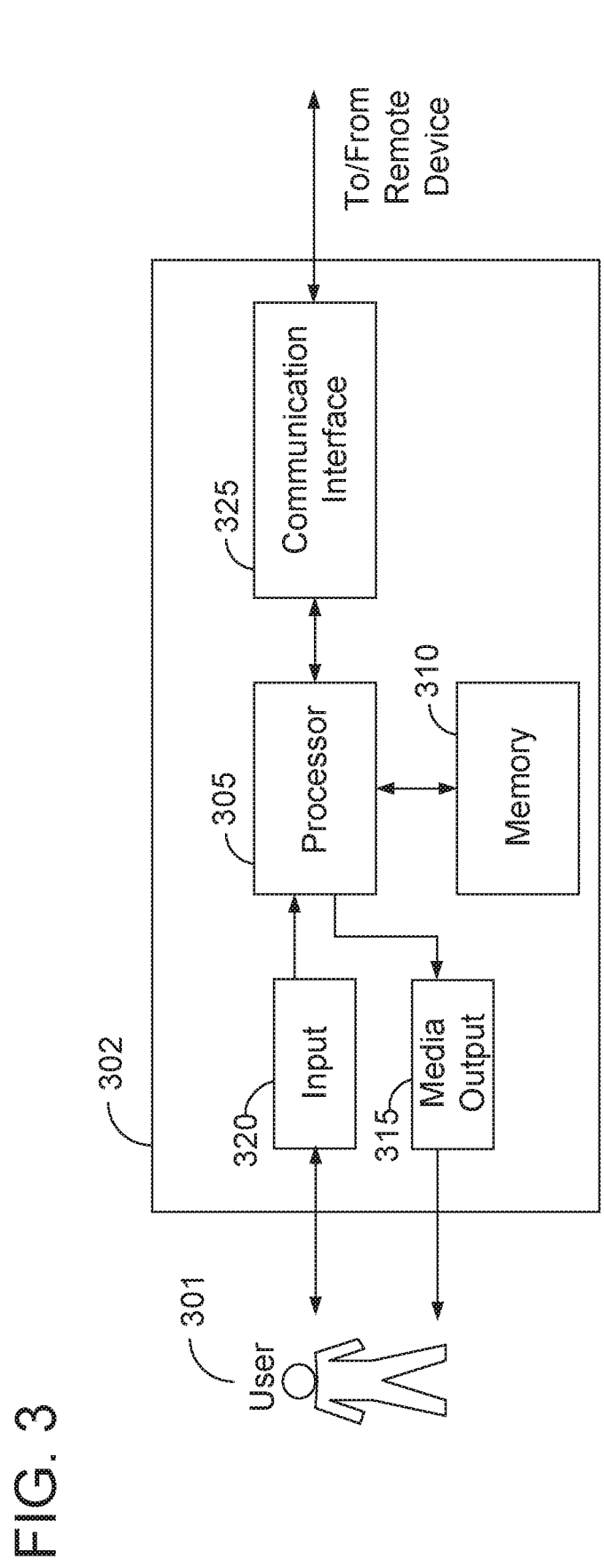

FIG. 3 illustrates an example configuration of a user system 302 operated by consumer 122, merchant 124 (shown in FIG. 2), or other user configured to transmit data to the SC computing device 250 (shown in FIG. 2). User system 302 may include, but is not limited to, consumer computing device 214. In the example embodiment, user system 302 includes a processor 305 for executing instructions. In some embodiments, executable instructions are stored in a memory 310. Processor 305 may include one or more processing units, for example, a multi-core configuration. Memory 310 is any device allowing information such as executable instructions and/or written works to be stored and retrieved. Memory 310 may include one or more computer readable media.

User system 302 also includes at least one media output component 315 for presenting information to user 301. User 301 may include, but is not limited to, consumer 122. Media output component 315 is any component capable of conveying information to user 301. For example, media output component 315 may be a display component configured to display component lifecycle data in the form of reports, dashboards, communications, or the like. In some embodiments, media output component 315 includes an output adapter, such as a video adapter and/or an audio adapter. An output adapter is operatively coupled to processor 305 and operatively connectable to an output device such as a display device, a liquid crystal display (LCD), organic light emitting diode (OLED) display, or "electronic ink" display, or an audio output device, a speaker or headphones.

In some embodiments, user system 302 includes an input device 320 for receiving input from user 301. Input device 320 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, an iris reader/scanner, a retina reader/scanner, a profile scanner, or the like. A single component, such as a touch screen, may function as both an output device of media output component 315 and input device 320. A single component such as a touch screen may function as both an output device of media output component 315 and input device 320. User system 302 may also include a communication interface 325, which is communicatively connectable to a remote device such as server system 212 (shown in FIG. 2). Communication interface 325 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory 310 are, for example, computer readable instructions for providing a user interface to user 301 via media output component 315 and, optionally, receiving and processing input from input device 320. A user interface may include, among other possibilities, a web browser and client application. Web browsers enable users, such as user 301, to display and interact with media and other information typically embedded on a web page or a website from server system 212. A client application allows user 301 to interact with a server application from server system 212.

Figure 4:
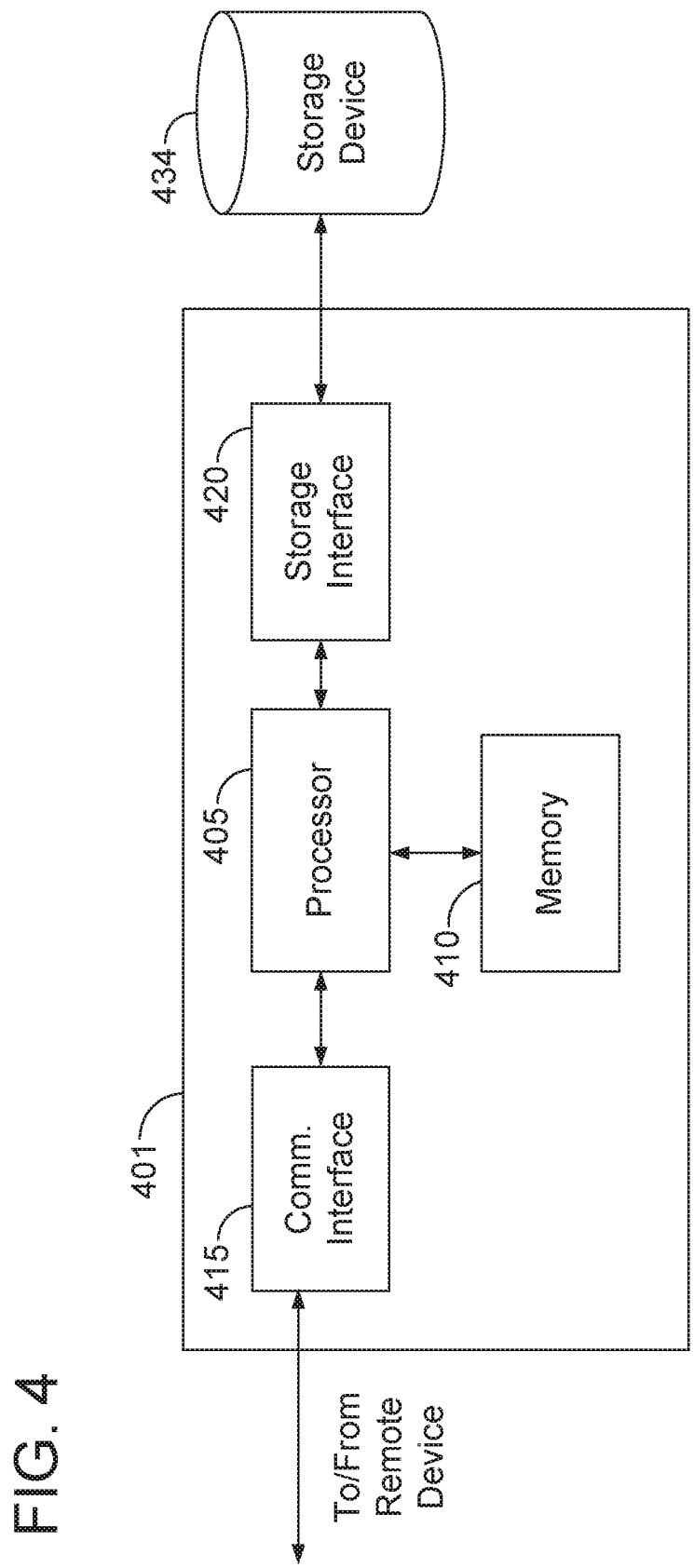

FIG. 4 illustrates an example configuration of a server system 401 such as the server system 212 (shown in FIG. 2) that includes SC computing device 250 (shown in FIG. 2). Server system 401 may include, but is not limited to, database server 216 (shown in FIG. 2) or SC computing device 250. In some embodiments, server system 401 is similar to server system 212.

Server system 401 includes a processor 405 for executing instructions. Instructions may be stored in a memory 410, for example. Processor 405 may include one or more processing units (e.g., in a multi-core configuration) for executing instructions. The instructions may be executed within a variety of different operating systems on the server system 401, such as UNIX, LINUX, Microsoft Windows®, etc.

More specifically, the instructions may cause various data manipulations on data stored in storage 434 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 405 is operatively coupled to a communication interface 415 such that server system 401 is capable of communicating with a remote device, such as a user system or another server system 401. For example, communication interface 415 may receive communications from issuer computing devices 130 via the Internet, as illustrated in FIG. 2.

Processor 405 may also be operatively coupled to a storage device 434. Storage device 434 is any computer-operated hardware suitable for storing and/or retrieving data. In some embodiments, storage device 434 is integrated in server system 401. In other embodiments, storage device 434 is external to server system 401 and is similar to database 220 (shown in FIG. 2). For example, server system 401 may include one or more hard disk drives as storage device 434. In other embodiments, storage device 434 is external to server system 401 and may be accessed by a plurality of server systems 401. For example, storage device 434 may include multiple storage units such as hard disks or solid state disks in a redundant array of inexpensive disks (RAID) configuration. Storage device 434 may include a storage area network (SAN) and/or a network attached storage (NAS) system.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Memory 410 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
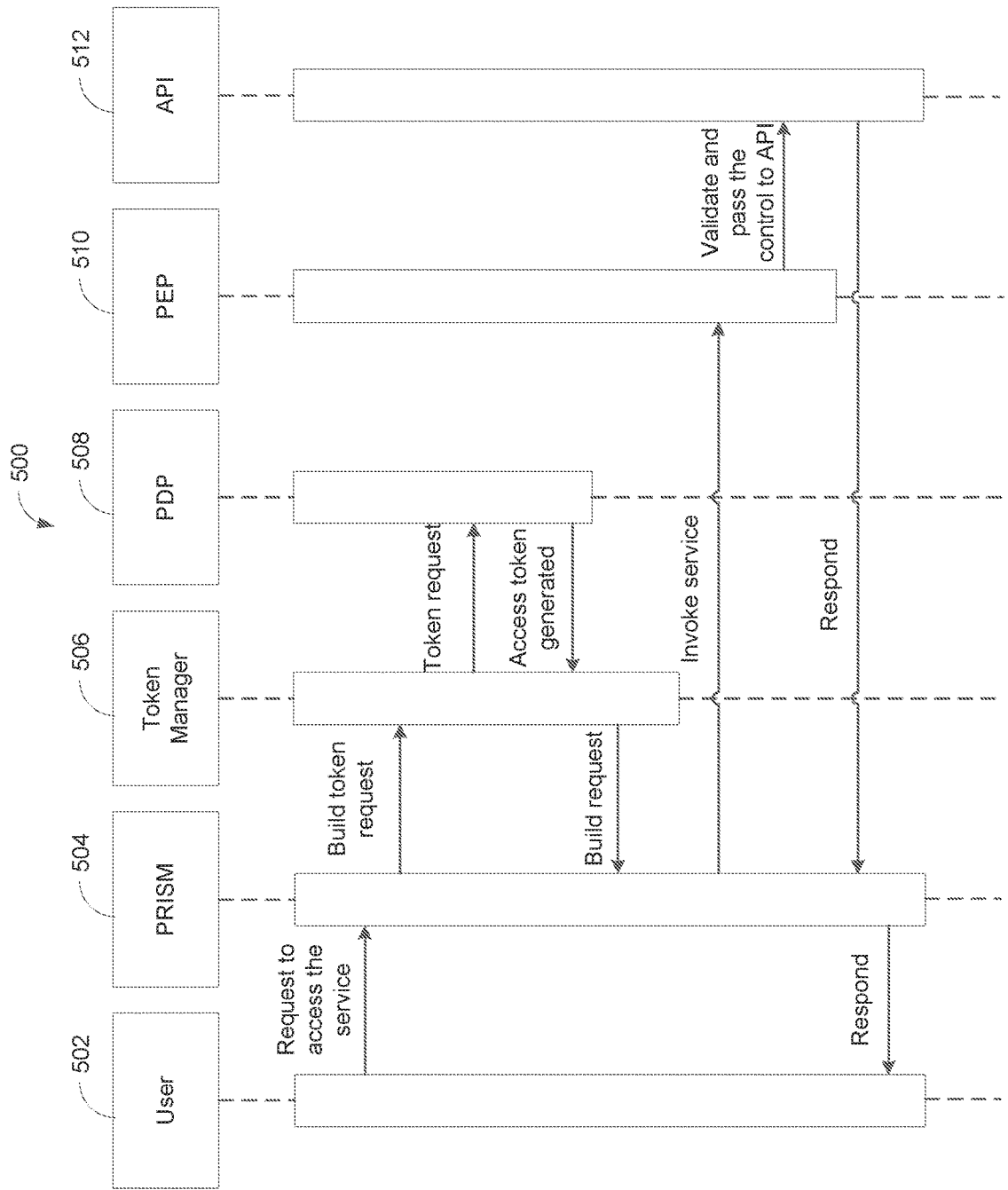

FIG. 5 is an example configuration 500 of a security control (SC) computing device 250 (shown in FIG. 2) configured to generate and execute policy definitions, and facilitate provisioning of credentials using the micro-service architecture of an API. SC computing device 250 is also configured to automate security policies for authentication and authorization based on a model that is generated. In the exemplary embodiment, the model is generated as part of the API architecture, by declarative runtime dependency definition. In the exemplary embodiment, SC computing device 250 includes and/or is in communication with a security controller (not shown), prism 504, a Policy Administration Point (PAP) (not shown), a Policy Decision Point (PDP) 508, a Policy Retrieval Point (PRP) (not shown), a Policy Enforcement Point (PEP) 510, and an Application Program Interface (API) 512.

The PAP is configured to create, update, delete, and retrieve policies, more specifically, policy schema. Policies in the PAP are accessible through a Software Development Kit (SDK), and APIs 512 may download the policies from the PAP using the SDK. The PAP is in communication with the PRP which is a database that the PAP uses to store policies. The PAP may provide interfaces to create and/or update any policy. The PAP may also provide interfaces to obtain a set of policies associated with one or more APIs 512. When requests include name and namespace, the PAP only retrieves active policies. Retrieval (read-only) method provides facility to query for policies using API's 512 Fully Qualified Domain Name (FQDN) attributes, such as HTTP GET/authorization/pap/policies/<service namespace>/<service name>. The PAP also provides interfaces for PDP to store and update public key and read only interface for APIs 512 for downloading the public key.

The PAP is also configured to grant to users read-only access to any API 512 policy. However, some users, such as Service Providers and Domain Representatives, may have Read/Write (RW) access to API 512 policies for all environments except for Production. Other user users, such as Corporate Security, may have write access to API 512 policies. The PAP is further configured to grant to users read-only access to public keys. However, PDP 508 may have RW access to public keys. Once an API 512 policy is designed, the policy needs to be signed by the PAP. In some embodiments, the signature may be stored in as an attribute within the policy. In other embodiments, the signature may be stored outside the policy.

PDP 508 is configured to download API 512 security policies available from the PAP and, more specifically, from the PRP. PDP 508 is also configured to store, in a cache cluster memory, the policies as secure shared cache. Once the security controller updates API 512 security policy through the PAP, the security controller pushes the update to PDP 508 to update the cache stored in the cache cluster memory. When user 502 (e.g., issuer, consumer, acquirer, merchant, or the like) submits to SC computing device 250 a request for accessing information, SC computing device 250 uses prism 504 to initiate the authentication and authorization process for the request. Prism 504, as used herein, refers to a SDK that performs multiple tasks, which include managing tokens and loading balance between multiple APIs 512.

Prism 504 includes Token Manager 506 that assembles and transmits a token request to PDP 508 upon receiving a request to build the token request from prism 504. The token request includes details associated with the user and the information (e.g., endpoint) that the user is trying to access. Such details may include a target endpoint, an action on the endpoint, a Fully Qualified Name (FQN), a system identifier, a computing device identifier, or the like. PDP 508 is configured to read the client Distinguished Name (DN) of the certificate from the MTLS protocol provided over user 502 session. PDP 508 is further configured to query the cache for the security policy for the target service of the request, retrieve the Group Distinguished Name (GDN) of the target endpoint and the action on the endpoint, and query the retrieved security policy for membership of the client DN to access the endpoint.

Once PDP 508 finishes processing the token request, PDP 508 generates and transmits an authorization or decline response to Token Manager 506. The authorization response may include "permitted", and the decline response may include "declined" or "not applicable". If the token request is authorized, PDP 508 generates an access token in the form of a JWS or a JSON Web Encryption (JWE) token which PDP 508 signs. If the security policies request for the access token to be encrypted, PDP 508 signs the access token first and then encrypt the access token. The signature and encryption algorithms are defined by API 512 policy. PDP 508 is configured to transmit the access token to Token Manager 506. When the access token is received by Token Manager 506, Token Manager 506 caches the access token and prism 504 adds the access token to an authorization request, invokes API 512 through PEP 510, and transmits the authorization request to API 512.

In the exemplary embodiment, PEP 510 is an interceptor plugged into API 512. PEP 510 is configured to analyze any API's 512 request before any other interceptors, making PEP 510 the highest priority interceptor. On the API startup, the PEP may download all the information from the PAP. On API 512 startup, PEP 510 may download all the information from the PAP that PEP 510 requires for validating an authorization request. The information may include API 512 policies and public keys in JSON Web Key (JWK) format. PEP 510 is configured to intercept API's 512 inbound requests. PEP 510 is also configured to validate the access token in the authorization request, and either grant or reject access to the authorization request to API 512. API 512 business logic has access to any identity that has been included within the access token. Therefore, API 512 may propagate the identity, if the identity is consuming another service, and/or may use the identity to control granularity of access to API's 512 functionality and data.

When user 502 calls any APIs 512, SC computing device 250 uses prism 504 to invoke the target service. Prism 504 may contain a cache of access tokens which may be updated prior to the access token expiration. A background process in prism 504 monitors the cached access tokens for their expiration time-stamp. If an access token is near to expire, the access token is refreshed/renewed and the cache is updated. This process improves performance and avoids the cycle of token request and generation on every token request.

In the exemplary embodiment, SC computing device 250 is configured to store information for each transaction, such as logs, events, and metrics. For example, SC computing device 250 may store any point to point messages irrespective of the severity, which may include user 502 to PDP 508, PDP 508 to user 502, and user 502 to API 512. SC computing device 250 may also store any log, event, or metric related to a denial of access ("severity": "ERROR"), which may include PDP 508 declining access or PEP 510 not authorizing an API's 512 request. SC computing device 250 may further store other internal processing related messages if the messages have severity above ERROR (e.g., CRITICAL, HIGH and ERROR). In addition, PDP 508 may log user 502 that is trying to access SC computing device 250 and whether the access was authorized or declined. PDP 508 may also log the type of token (e.g., encoded or decoded) that is trying to access SC system 250 and whether the access was authorized or declined.

Figure 6:
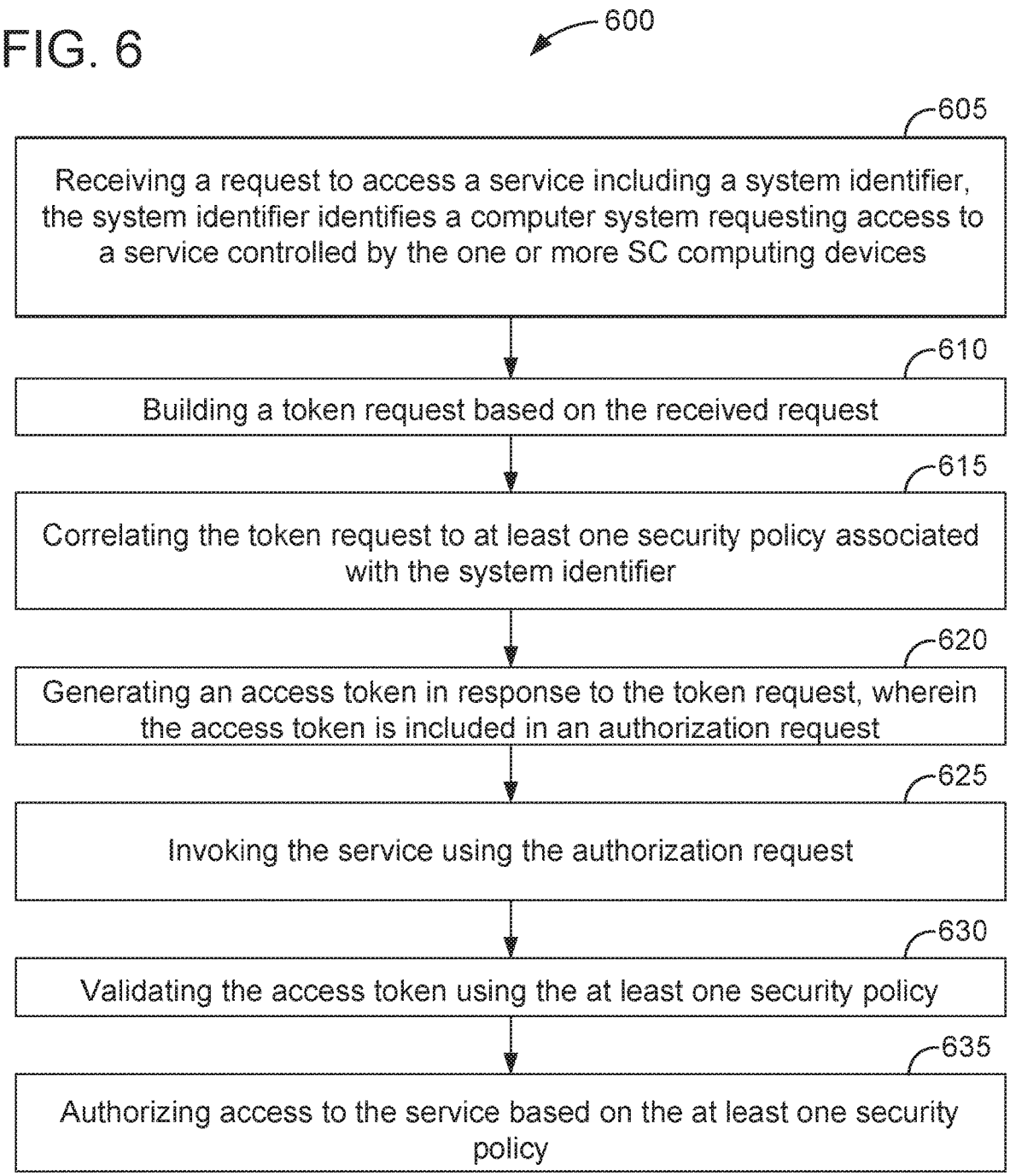

FIG. 6 is an example flow diagram illustrating a method flow 600 by which SC computing device 250 (shown in FIG. 2) generates and executes policy definitions, facilitates provisioning of credentials using the micro-service architecture of API 512 (shown in FIG. 5), and automates security policies for authentication and authorization based on a model that is generated, as part of API 512 architecture. Method 600 includes receiving 605 a request to access a service including a system identifier, building 610 a token request based on the received request, and correlating 615 the token request to at least one security policy associated with the system identifier. Method 600 also includes generating 620 an access token in response to the token request, wherein the access token is included in an authorization request, and invoking 625 the service using the authorization request. Method 600 further includes validating 630 the access token using the at least one security policy, and authorizing 635 access to the service based on the at least one security policy.

Figure 7:
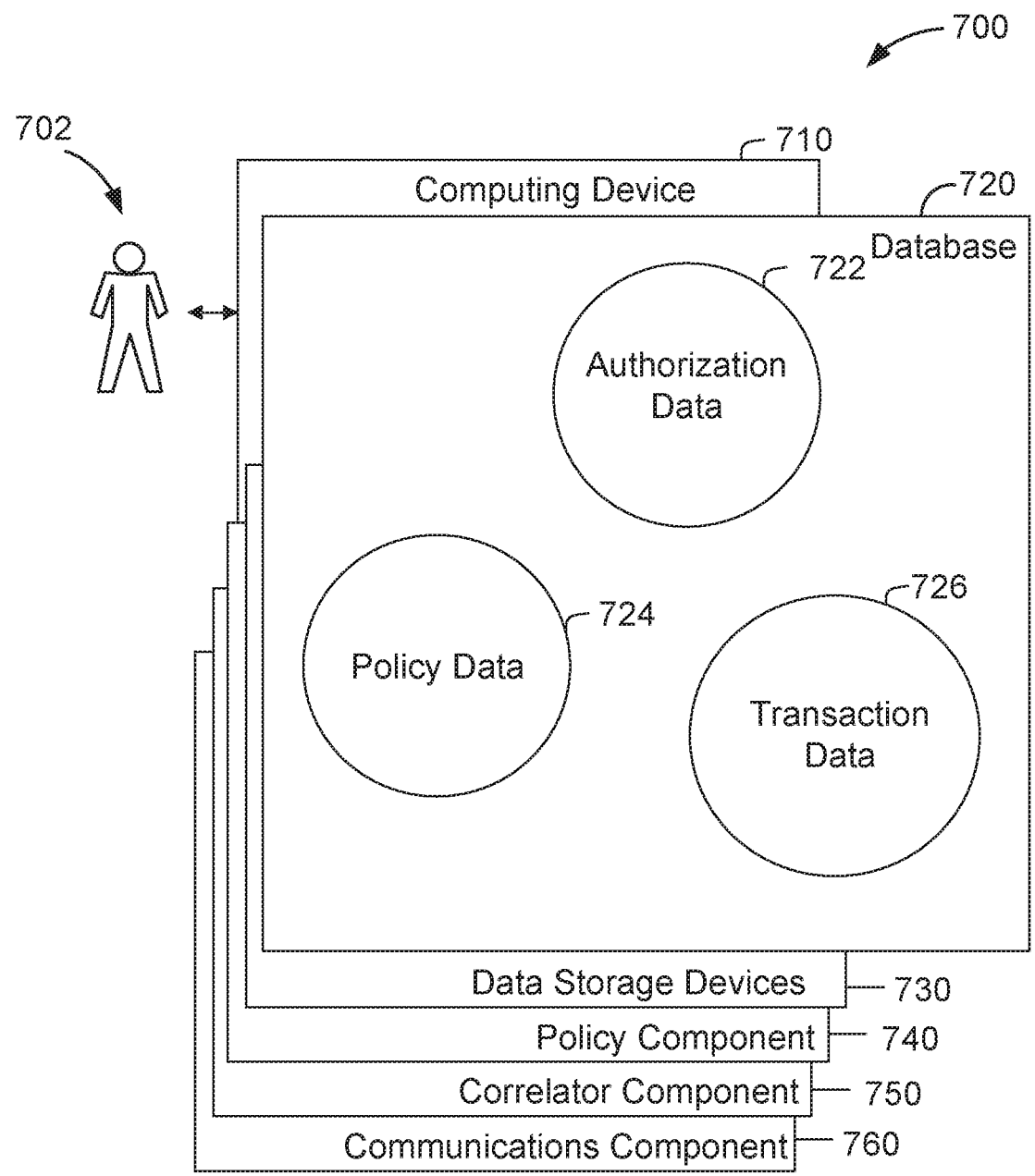

FIG. 7 shows an example configuration of a database 700 within a computing device, along with other related computing components, that may be used to automate security controls between computer networks. In some embodiments, computing device 710 is similar to server system 212 (shown in FIG. 2). User 702 (such as a user operating server system 212) may access computing device 710 in order to retrieve data for each transaction, such as logs, events, and metrics. Some example data may be any point to point messages irrespective of the severity, any log, event, or metric related to a denial of access, and/or other internal processing related messages if the messages have severity above ERROR (e.g., CRITICAL, HIGH and ERROR).

In some embodiments, database 720 is similar to database 220 (shown in FIG. 2). In the example embodiment, database 720 includes authorization data 722, policy data 724, and transaction data 726. Authorization data 722 may include user 502 (shown in FIG. 2) data (e.g., data associated with user 502 such as an account number, an user identifier, a type of user, or the like), consumer 122 computing device data (e.g., IP address data, MAC address data), authorization request message time stamp (e.g., time the authorization request message was received and/or stored in computing device 710), and other data, including historical data, associated with user 502.

Policy data 724 may include security policies downloaded from the PAP (e.g., current policies and obsolete policies), type of policy (e.g., policies requiring a token request to be encrypted and policies enabling renewal of access when a time stamp has expired), time stamp threshold for each policy, and other related data to the security policies. Transaction data 726 may include transaction amounts, transaction dates/times, account data related to the payment card used to perform the transaction (e.g., PAN associated with payment card, card expiration date, card issuer, card security code, or the like), merchant identifiers, stock-keeping unit (SKU) data relating to the goods or services purchased by consumer 122 (shown in FIG. 1), or the like.

Computing device 710 also includes data storage devices 730. Computing device 710 also includes a policy component 740 that manage security policies. Policy component 740 may perform, for example, comparing 615 (shown in FIG. 6) the token request to at least one security policy associated with the system identifier and validating 630 (shown in FIG. 6) the access token using the at least one security policy, and authorizing access to the service based on the at least one security policy.

Computing device 710 also includes correlator component 750 that facilitates correlating data, more specifically, correlating 615 (shown in FIG. 6) the token request to at least one security policy associated with the system identifier. Computing device 710 also includes communications component 760 which is used to communicate with issuer computing devices, merchant computing devices, and/or other computing devices using predefined network protocols such as TCP/IP (Transmission Control Protocol/Internet Protocol) over the Internet.

As will be appreciated based on the foregoing specification, the above-described embodiments of the disclosure may be implemented using computer programming or engineering techniques including computer software, firmware, hardware or any combination or subset thereof, wherein the technical effect is to automate security controls between computer networks. Any such resulting program, having computer-readable code means, may be embodied or provided within one or more computer-readable media, thereby making a computer program product, (e.g., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A security control (SC) system comprising one or more security control (SC) computing devices for automating security controls between computer networks, the one or more SC computing devices comprising at least one processor and a memory, the SC system configured to:
  generate, using a declared dependency graph, a network topology based on service metadata identifying zones of the computer networks;
  identify one or more computer systems included in the computer networks based on the network topology, wherein the identified one or more computer systems are one or more non-privileged access computer systems that do not require privileged access to a service controlled by the one or more SC computing devices;

receive a request to access the service including a system identifier, the system identifier identifies a candidate computer system requesting access to the service;

perform a lookup in the network topology for the candidate computer system;

determine that the candidate computer system is not one of the one or more non-privileged access computer systems based on results from the lookup;

in response to the determination, build a token request based on the received request;

download, from a policy administration point (PAP), at least one security policy and at least one public key, the at least one security policy and the at least one public key associated with the system identifier;

correlate the token request to the at least one security policy and the at least one public key;

generate an access token in response to the token request, wherein the access token is included in an authorization request;

invoke the service using the authorization request;

validate the access token using the at least one security policy and the at least one public key; and authorize access to the service in response to the validation.

2. The SC system of claim 1 further configured to monitor a time stamp included in the access token.

3. The SC system of claim 2 further configured to deny access to the service when the time stamp meets a predefined threshold.

4. The SC system of claim 3 further configured to renew access to the service when the time stamp meets the predefined threshold and the at least one security policy enables to renew access to the service.

5. The SC system of claim 1 further configured to generate the access token and encrypt the access token based on the at least one security policy.

6. The SC system of claim 1 further configured to store data included in the access token in a database, wherein the database is in communication with the SC system.

7. A computer-implemented method for automating security controls between computer networks, the method implemented using one or more security control (SC) computing devices coupled to a memory device, the method comprising:

generating, using a declared dependency graph, a network topology based on service metadata identifying zones of the computer networks;

identifying one or more computer systems included in the computer networks based on the network topology, wherein the identified one or more computer systems are one or more non-privileged access computer systems that do not require privileged access to a service controlled by the one or more SC computing devices;

receiving a request to access the service including a system identifier, the system identifier identifies a candidate computer system requesting access to the service;

performing a lookup in the network topology for the candidate computer system;

determining that the candidate computer system is not one of the one or more non-privileged access computer systems based on results from the lookup;

in response to the determination, building a token request based on the received request;

downloading, from a policy administration point (PAP), at least one security policy and at least one public key, the at least one security policy and the at least one public key associated with the system identifier;

correlating the token request to the at least one security policy and the at least one public key;

generating an access token in response to the token request, wherein the access token is included in an authorization request;

invoking the service using the authorization request;

validating the access token using the at least one security policy and the at least one public key; and authorizing access to the service in response to the validation.

8. The method of claim 7 further comprising monitoring a time stamp included in the access token.

9. The method of claim 8 further comprising denying access to the service when the time stamp meets a predefined threshold.

10. The method of claim 9 further comprising renewing access to the service when the time stamp meets the predefined threshold and the at least one security policy enables to renew access to the service.

11. The method of claim 7 further comprising generating the access token and encrypt the access token based on the at least one security policy.

12. The method of claim 7 further comprising storing data included in the access token in a database, wherein the database is in communication with the one or more SC computing devices.

13. A non-transitory computer-readable medium that includes computer-executable instructions for automating security controls between computer networks, wherein when executed by one or more security control (SC) computing devices comprising at least one processor in communication with at least one memory device, the computer-executable instructions cause the one or more SC computing devices to:

generate, using a declared dependency graph, a network topology based on service metadata identifying zones of the computer networks;

identify one or more computer systems included in the computer networks based on the network topology, wherein the identified one or more computer systems are one or more non-privileged access computer systems that do not require privileged access to a service controlled by the one or more SC computing devices;

receive a request to access the service including a system identifier, the system identifier identifies a candidate computer system requesting access to service;

perform a lookup in the network topology for the candidate computer system;

determine that the candidate computer system is not one of the one or more non-privileged access computer systems based on results from the lookup;

in response to the determination, build a token request based on the received request;

download, from a policy administration point (PAP), at least one security policy and at least one public key, the at least one security policy and the at least one public key associated with the system identifier;

correlate the token request to the at least one security policy and the at least one public key;

generate an access token in response to the token request, wherein the access token is included in an authorization request;

invoke the service using the authorization request;

validate the access token using the at least one security policy and the at least one public key; and authorize access to the service in response to the validation.

14. The computer-readable medium of claim 13 wherein the computer-executable instructions further cause the one or more SC computing devices monitor a time stamp included in the access token.

15. The computer-readable medium of claim 14 wherein the computer-executable instructions further cause the one or more SC computing devices to deny access to the service when the time stamp meets a predefined threshold.

16. The computer-readable medium of claim 15 wherein the computer-executable instructions further cause the one or more SC computing devices to renew access to the service when the time stamp meets the predefined threshold and the at least one security policy enables to renew access to the service.

17. The computer-readable medium of claim 13 wherein the computer-executable instructions further cause the one or more SC computing devices to generate the access token and encrypt the access token based on the at least one security policy.

18. The computer-readable medium of claim 13 wherein the computer-executable instructions further cause the one or more SC computing devices to store data included in the access token in a database, wherein the database is in communication with the one or more SC computing devices.

\* \* \* \* \*